United States Patent [19]

Orikasa

[11] Patent Number: 4,574,164
[45] Date of Patent: Mar. 4, 1986

[54] RINGING SIGNAL TRANSMISSION SYSTEM FOR RADIOTELEPHONE SYSTEM

[75] Inventor: Hiromi Orikasa, Tokyo, Japan

[73] Assignee: NEC Corporation, Tokyo, Japan

[21] Appl. No.: 652,296

[22] Filed: Sep. 19, 1984

[30] Foreign Application Priority Data

Sep. 26, 1983 [JP] Japan .............................. 58-178684

[51] Int. Cl.$^4$ ............................................. H04Q 7/04
[52] U.S. Cl. .................................. 179/2 EB; 179/2 E
[58] Field of Search .............................. 179/2 E-2 EC

[56] References Cited

U.S. PATENT DOCUMENTS

| | | | |
|---|---|---|---|
| 3,692,952 | 9/1972 | Leonard | 179/2 EB |
| 3,906,166 | 9/1975 | Cooper et al. | 179/2 EB |
| 4,320,265 | 3/1982 | Biggiogera et al. | 179/2 EB X |

Primary Examiner—W. J. Brady
Attorney, Agent, or Firm—Laff, Whitesel, Conte & Saret

[57] ABSTRACT

A base station (coast station) of such a radiotelephone system as a maritime mobile radiotelephone system is connected to a telephone exchange of a public telecommunication network. A ringing signal from a subscriber's station of the telecommunication network which is connected to the exchange is transmitted to an end station (ship station) of the radiotelephone system by way of the line concentrator and a radio section between the base and end stations. When a false calling tone signal is sent from a tone signal delivery circuit included in the line concentrator to an end station for a predetermined short period of time upon completion of a connection between the exchange and the end station, with no regard to a ringing signal from the exchange, a subscriber's telephone at the end station produces a calling tone. Thereafter, the line concentrator delivers a calling tone signal in synchronism with a ringing signal from the exchange. The telephone at the terminal station, therefore, produces a tone immediately after a connection has been completed, so that the subscriber at the end station is prevented from off-hooking during an interruption time of a calling tone to cause collision of receipt of a call and origination of a call.

2 Claims, 15 Drawing Figures

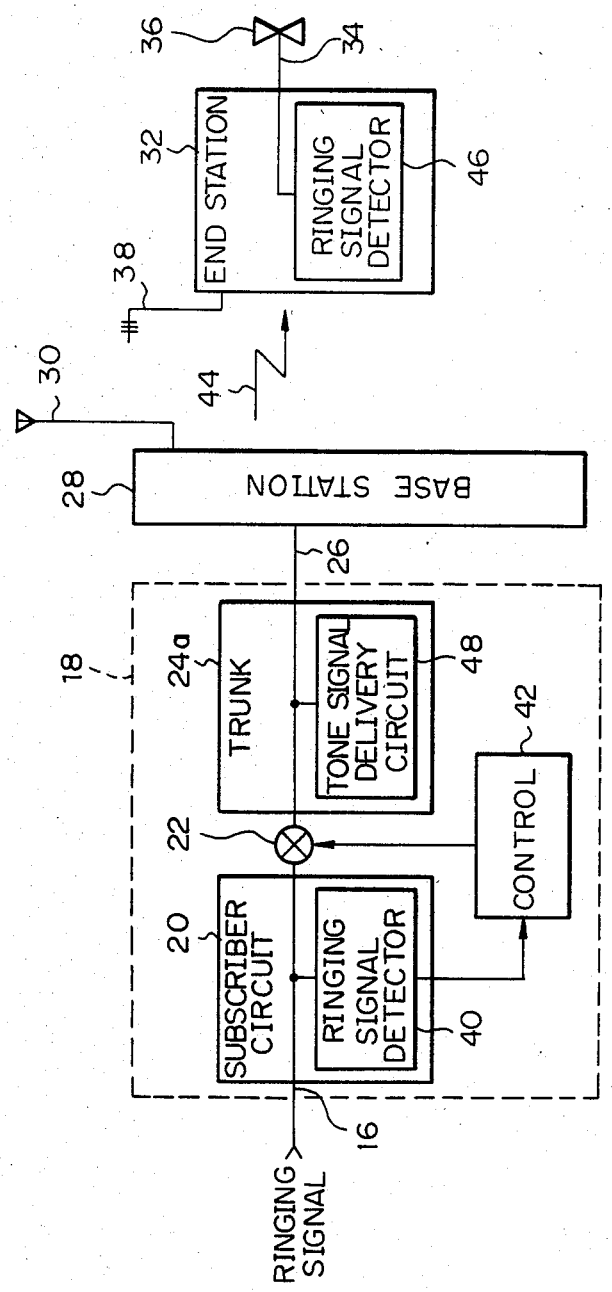

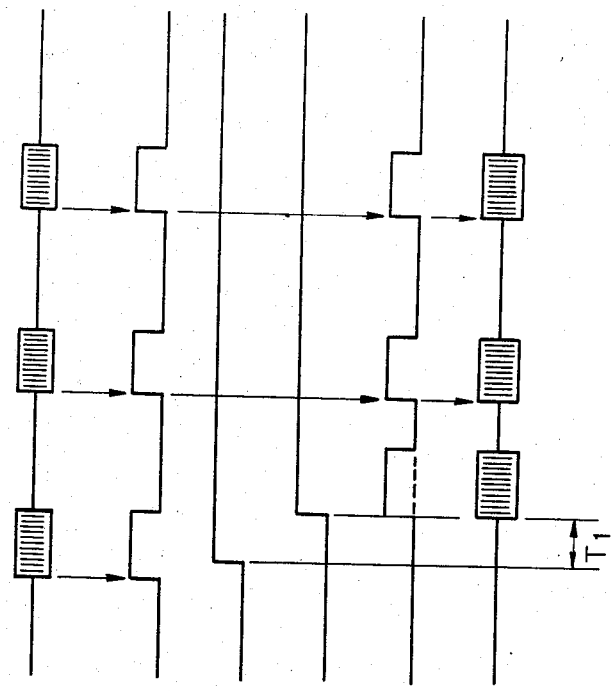

RINGING SIGNAL TRANSMISSION SYSTEM FOR RADIOTELEPHONE SYSTEM

BACKGROUND OF THE INVENTION

The present invention relates to a ringing signal transmission system associated with a multi-channel access radiotelephone system, particularly a maritime mobile radiotelephone system having a base station (e.g. coast station) connecting to a public telephone swiching network, for transmitting a ringing signal which is generated when a subscriber of the switching network calls an end station (e.g. ship station) of the radiotelephone system.

In a radiotelephone system of the kind described, e.g., a maritime mobile radiotelephone system connected to a telephone exchange of a public telecommunication network, it has been customary to effect connection control and, then, transmission of a ringing signal in the following manner when an end station of the radiotelephone system is called by a subscriber of the telecommunication network. Upon receipt of a call from a subscriber of the telecommunication network, the telephone exchange is caused into connection with a line concentrator so as to send a ringing signal to a called subscriber's line by way of a base station connected to the line concentrator, i.e. coast station. The line concentrator recognizes the call by detecting the ringing signal and starts on a connection with a ship station corresponding to the subscriber's line. In this connection responsive to a call, while various signals are exchanged between the line concentrator and the ship station as well known in the art, the method of exchanging such signals is not directly relevant to the present invention, and therefore, details of the connection will not be described herein. Upon completion of the connection, a telephone associated with the ship station is caused to produce a tone. For producing the tone, the line concentrator sends a tone signal to the ship station in synchronism with a ringing signal which is sent thereto from the telephone exchange.

Generally, the ringing signal applied from the telephone exchange to the line concentrator is an intermittent signal which may be transmitted for one second and interrupted for the subsequent two seconds, for example. Therefore, when the line concentrator after detection of a one-second transmission time of the ringing signal has started on a connection and, then, the connection has been set up at the beginning of a two-second interruption time, the telephone associated with the ship station does not immediately produce a calling tone despite the completion of the connection. That is, the calling tone does not occur until the ringing signal reappears after the two seconds of interruption. Stated another way, the subscriber at the ship station cannot recognize the receipt of a call until the tone is produced from the telephone. It follows that when the subscriber off-hooks during the two-second interruption time of the ringing signal with the intention of originating a call, he or she suddenly hears subscriber's voice from the telecommunication network on the land via the coast station. Such would raise strange and uneasy sensation in the subscriber at the ship station.

SUMMARY OF THE INVENTION

It is therefore an object of the present invention to provide a ringing signal transmission system for a public radiotelephone system which eliminates collision of an incoming call and an outgoing call even if a subscriber at an end station of the radiotelephone system off-hooks with the intention of originating a call without knowing the receipt of a call during the interruption time of a calling tone after the completion of a connection between a telephone exchange of the radiotelephone network and the end station.

It is another object of the present invention to provide a generally improved ringing signal transmission system for a public radiotelephone system.

In a radiotelephone system comprising a telephone switching network which includes a telephone exchange for sending a ringing signal, at least one base station connected to the telephone switching network, and a plurality of end stations each being provided with a telephone, wherein a multi-channel access radio section is set up between the base station and each of the end stations and the telephone at each of the end stations produces a calling tone in synchronism with a ringing signal after the ringing signal from the telephone exchange is transmitted over the radio section, a ringing signal transmission system of the present invention comprises trunk circuits connected between the base station and the telephone exchange in correspondence with channels of the radio section, and a tone signal generator circuit called by the telephone exchange to generate a calling tone signal for a predetermined period of time immediately after the completion of a connection of the radio section for a call to be received by one of the end stations, with no regard to a ringing signal to be delivered from the telephone exchange. The calling tone signal is transmitted to the end station.

In a preferred embodiment, the trunk circuits constitute trunk circuits of a line concentrator which is interposed between the telephone switching network and the base station.

The above and other objects, features and advantages of the present invention will become apparent from the following detailed description taken with the accompanying drawings.

BRIEF DESCRIPTION OF THE DRAWINGS

FIG. 4 is a detailed block diagram of a line concentrator and an end station equipped with a tone signal delivery circuit in accordance with one embodiment of the present invention; and FIGS. 5A-5F are timing charts representative of signals or operations associated with the arrangement of FIG. 4.

DESCRIPTION OF THE PREFERRED EMBODIMENT

While the ringing signal transmission system for a radiotelephone system of the present invention is susceptible of numerous physical embodiments, depending upon the environment and requirements of use, a substantial number of the herein shown and described embodiment have been made, tested and used, and all have performed in an eminently satisfactory manner.

Figure 1:
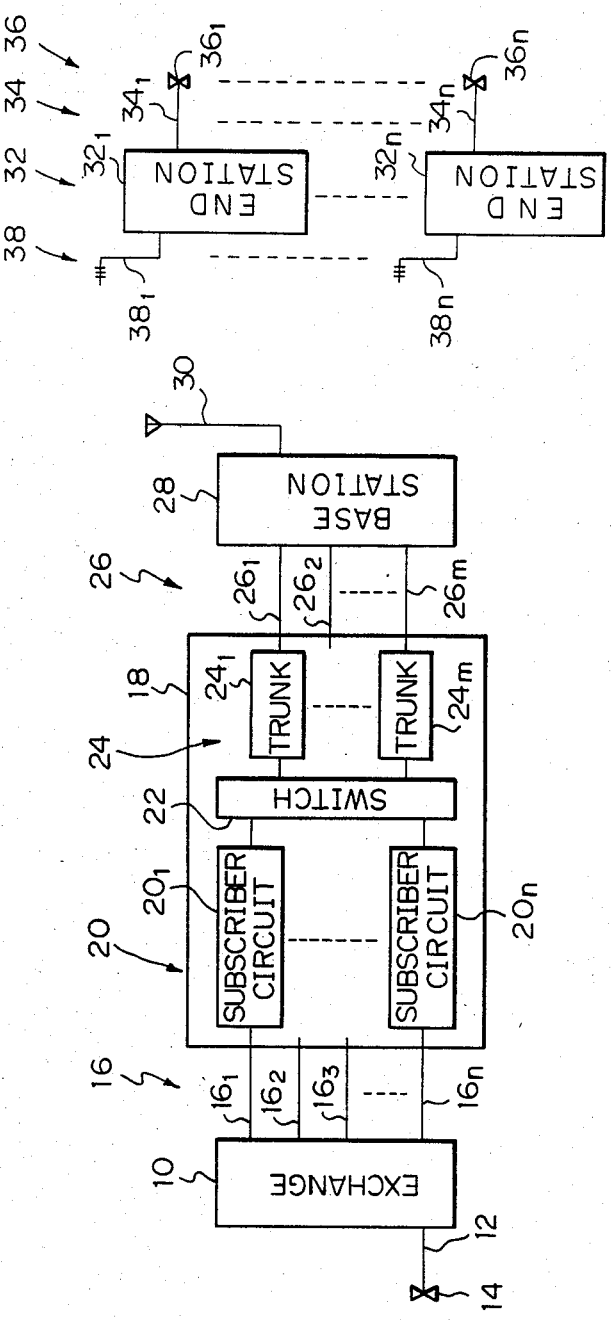
FIG. 1 is a block diagram showing an example of prior art multi-channel access radiotelephone systems to which a ringing signal transmission system of the present invention is applicable.
Figure 2:
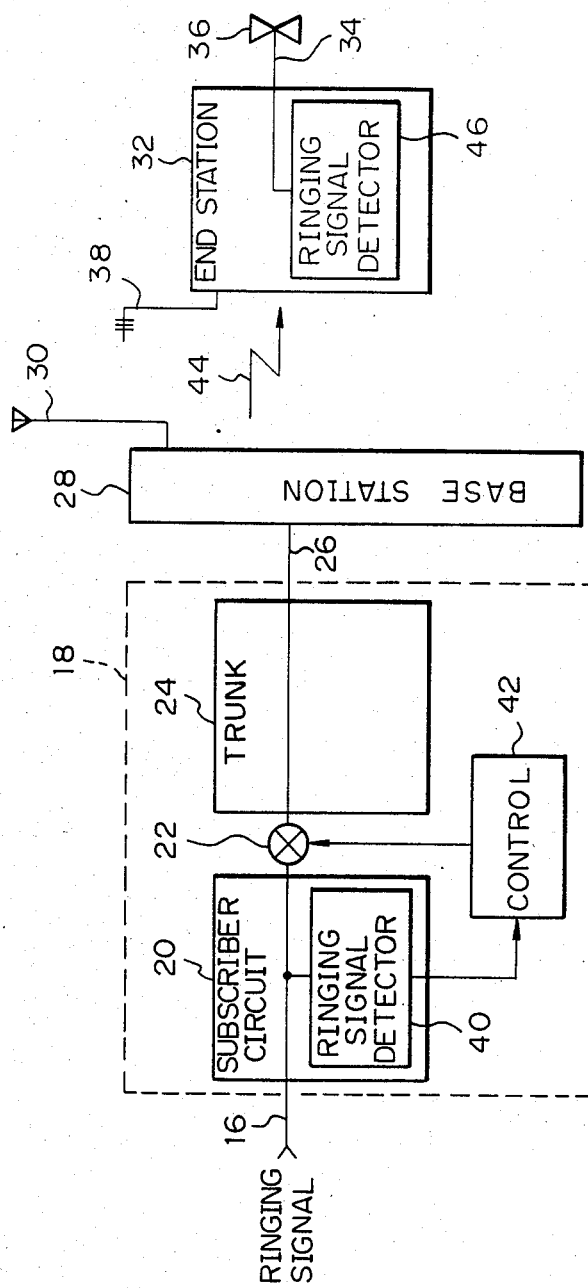
FIG. 2 is a block diagram showing details of a line concentrator and an end station which is included in the radiotelephone system of FIG. 1.

Reference will first be made to FIGS. 1 and 2 for describing a prior art radiotelephone system.

Referring to FIG. 1, a multi-channel access radiotelephone system to which the ringing signal transmission system of the present invention is applicable. In FIG. 1, a telephone exchange 10 forms part of a public telecommunication network and is connected to a subscriber's telephone 14 by a subscriber's line 12. Needless to mention, the telephone exchange 10 is also connected to many other subscriber's telephones each by a subscriber's line. A line concentrator 18 is connected to the telephone exchange 10 by n pairs of subscriber's lines 16. The line concentrator 18 comprises n subscriber circuits 20 interfacing respectively to the n subscriber's lines 16, a switch 22 for line concentration, and m trunk circuits 24 commonly interfacing to a base station 28 which has m channels 26 and an antenna 30. The number n is larger than or equal to the number m. A number of end stations 32 connect to telephones 36 in one-to-one correspondence in principle, via lines 34. Each end station 32 is provided with an antenna 38. The n end stations 32 are scattered in the communication range of the base station 28 and are equal in number to the subscriber's lines 16, the subscriber's lines 16 and the telephones 36 at the end stations 32 being in one-to-one correspondence.

The line concentrator 18 and one of the end stations 32 included in the system of FIG. 1 are shown in detail in FIG. 2. Signals appearing in them and associated operations are shown in timing charts in FIGS. 3A-3F. In FIG. 2, the same circuits, subscriber's line and channel as those shown in FIG. 1 are designated by like reference numerals.

First, the flow of signals will be described which occurs up to the instant when the subscriber's telephone 36 at the end station 32 produces a calling tone after the subscriber circuit 20, trunk circuit 24 and end station 32 have detected a ringing signal from the telephone exchange 10. When a ringing signal is applied from the exchange 10 to the subscriber's line 16, a ringing signal detector circuit 40 in the subscriber circuit 20 detects the ringing signal to see the receipt of a call at the subscriber circuit and notifies it to a control circuit 42. The control circuit 42 in turn applies a control signal to the switch 22 so as to close it and, thereby, connect the subscriber circuit 20 the trunk circuit 24.

Figures 3A, 3B, 3C, 3D, 3E, 3F:
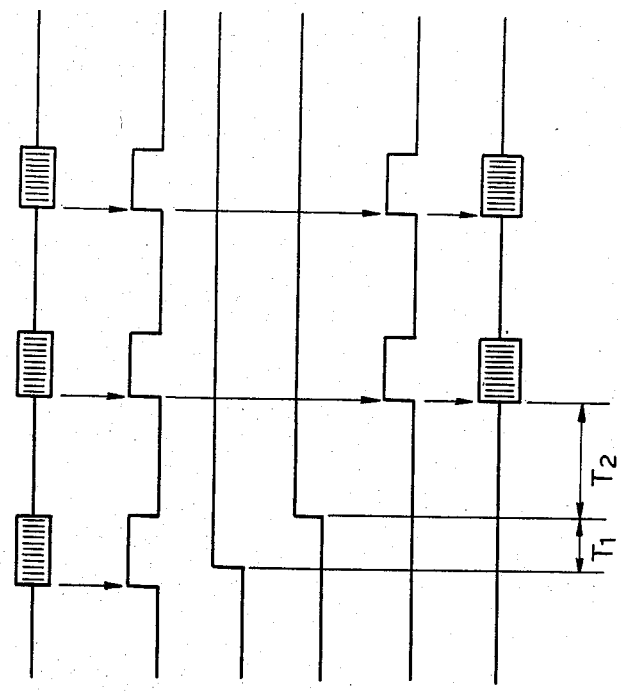
FIGS. 3A-3F are timing charts representative of signals and operations associated with the arrangement shown in FIG. 2.

FIG. 3A shows the ringing signal which is sent over the subscriber's line 16, FIG. 3B the detection of the ringing signal by the ringing signal detector 40, and FIG. 3C the varying position of the switch 22. The trunk circuit 24, recognizing that the switch 22 has closed, performs a connection with the end station 32 which is associated with the subscriber. FIG. 3D shows that the connection has completed upon the lapse of time $T_1$ after closing of the switch 22. It is possible, therefore, for the telephone 36 to ring to inform the subscriber at the end station 32 of the receipt of a call.

However, as shown in FIG. 3D, the ringing signal from the exchange 10 is in an interruption time at the instant when the connection has been completed. A calling tone signal which is sent to the end station 32 over a radio section 44 is shown in FIG. 3E. As shown, it is only upon the lapse of time $T_2$ after the completion of the connection that the calling tone signal is sent. FIG. 3F shows a ringing signal which is generated by a ringing signal generator circuit 46 shown in FIG. 2 in synchronism with the calling tone signal of FIG. 3E. The result is an undesirable occurrence that the subscriber off-hooked during the time $T_2$ at the end station 32 suddenly hears voice despite that he or she has not dialed.

The present invention is elaborated to preclude the undesirable occurrence discussed above and will hereinafter be described in conjunction with a preferred embodiment thereof, shown in FIGS. 4 and 5A-5F.

Referring to FIG. 4, there is shown a circuit arrangement of the line concentrator 18 in which a trunk circuit 24a includes a tone signal delivery circuit 48 in accordance with one embodiment of the present invention. In FIG. 4, the same circuits, subscriber's line and channel as those shown in FIG. 1 are designated by like reference numerals. The subscriber's line 16 connected to the telephone exchange 10 shown in FIG. 1 is connected to the switch 22 by way of the subscriber circuit 20 in the line concentrator 18. The output of the switch 22 is connected to the base station 28 by the channel 26. The subscriber's line 16 is also connected to the ringing signal detector circuit 40 in the subscriber circuit 20. The output of the ringing signal detector circuit 40 is connected to the control circuit 42. A control signal outputted from the control circuit 42 is applied to the switch 22. The output of the switch 22 is routed to the tone signal delivery circuit 48 in the trunk circuit 24. The output of the base station 28 is sent to the end station 32 over the radio section 44. The output of the ringing signal generator circuit 46 at the end station 32 is connected to the telephone 36 by the line 34.

A characteristic feature of the ringing signal transmission system of the present invention is that the tone signal delivery circuit 48 is installed in the trunk circuit 24a in order to send a calling tone signal for a short period of time immediately after the completion of a connection.

The operation of the tone signal delivery circuit 48 having the above construction will be described. Signals appearing in the line concentrator 18 with the tone delivery circuit 48 of the present invention and in the end station 32 as well as associated operations are represented by timing charts in FIGS. 5A-5F. Upon detection of a ringing signal outputted from the telephone exchange 10, a connection with the end station 32 begins. As shown in FIGS. 5A-5D, the operations are the same as those of the prior art system up to the completion of a connection which occurs upon the lapse of time $T_1$ after the first detection of a ringing signal. The trunk circuit 24a, seeing that the connection has completed, activates the tone signal delivery circuit 48 for a predetermined short period of time so as to send a calling tone signal, as shown in FIG. 5E. The telephone 36 at the end station 32, therefore, is allowed to produce a calling tone immediately after the completion of the connection, as shown in FIG. 5F. This eliminates the occurrence that, as in the prior art system, the subscriber at a terminal station off-hooks to cause collision of an incoming call and an outgoing call because a tone is not produced despite the completion of a connection.

In summary, it will be seen that the present invention provides a ringing signal transmission system for a radiotelephone system which prevents a subscriber at an end station from off-hooking without noticing receipt of a call, thereby eliminating collision of receipt of a call and origination of a call. This unique feature is derived from the inherent construction in which a trunk circuit of a line concentrator is equipped with a tone signal delivery circuit in order to deliver a false calling tone signal to the end station for a predetermined short period of time at the instant when a connection has completed, causing a telephone at the end station to ring.

Various modifications will become possible for those skilled in the art after receiving the teachings of the present disclosure without departing from the scope thereof.

What is claimed is:

1. In a radiotelephone system comprising a telephone switching network which includes a telephone exchange for sending a ringing signal, at least one base station connected to the telephone switching network, and a plurality of end stations each being provided with a telephone, wherein a multi-channel access radio section is set up between the base station and each of the end stations and the telephone at each of the end stations produces a calling tone in synchronism with a ringing signal after the ringing signal from the telephone exchange is transmitted over the radio section, a ringing signal transmission system comprising:

trunk circuits connected between the base station and the telephone exchange in correspondence with channels of the radio section; and a tone signal generator circuit called by the telephone exchange to generate a calling tone signal for a predetermined period of time immediately after the completion of a connection of the radio section for a call to be received by one of the end stations, with no regard to a ringing signal to be delivered from the telephone exchange, said calling tone signal being transmitted to said one end station.

2. A ringing signal transmission system as claimed in claim 1, in which the trunk circuits constitute trunk circuits of a line concentrator which is interposed between the telephone switching network and the base station.

* * * * *